United States Patent
Thompson et al.

(10) Patent No.: US 10,467,376 B2
(45) Date of Patent: Nov. 5, 2019

(54) UNMANNED AIRCRAFT SYSTEMS AND METHODS OF ASSEMBLY

(71) Applicant: Walmart Apollo, LLC, Bentonville, AR (US)

(72) Inventors: John P. Thompson, Bentonville, AR (US); Donald R. High, Noel, MO (US); Nathan G. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 211 days.

(21) Appl. No.: 15/467,783

(22) Filed: Mar. 23, 2017

(65) Prior Publication Data
US 2017/0277825 A1 Sep. 28, 2017

Related U.S. Application Data

(60) Provisional application No. 62/313,314, filed on Mar. 25, 2016.

(51) Int. Cl.
*G06F 17/50* (2006.01)
*G06Q 30/06* (2012.01)
*H04B 7/185* (2006.01)

(52) U.S. Cl.
CPC ..... *G06F 17/5095* (2013.01); *G06Q 30/0621* (2013.01); *H04B 7/18504* (2013.01); *G06F 2217/02* (2013.01)

(58) Field of Classification Search
CPC . G06F 17/5095; G06F 2217/02; H04L 67/10; H04B 7/18504; G06Q 30/0621
See application file for complete search history.

(56) References Cited

U.S. PATENT DOCUMENTS

| 7,542,828 B2 * | 6/2009 | Steele ................... B64C 39/024 244/190 |
| 8,437,885 B1 | 5/2013 | Beazley |
| 8,660,712 B2 | 2/2014 | Grabowsky |

(Continued)

FOREIGN PATENT DOCUMENTS

EP 2963519 9/2016

OTHER PUBLICATIONS

"Quadrotors/Hexarotors Drones: Robokits India, Easy to use, Versatile Robotics & DIY kits"; http://robokits.co.in/quadrotors-hexarotors-drones; Retrieved on Sep. 4, 2015; 16 pages.

(Continued)

*Primary Examiner* — Jay Hann
(74) *Attorney, Agent, or Firm* — Fitch, Even, Tabin & Flannery LLP

(57) ABSTRACT

Some embodiments provide a system to design an unmanned aircraft system (UAS) based on an intended task, comprising: UAS component database and a design control circuit configured to: obtain a first set of multiple task parameters corresponding to a requested task that the UAS is being designed to perform; identify at least one primary type of UAS component to be included in the UAS being designed; identify a first set of one or more secondary types of UAS components to support the primary type of UAS component while implementing the task; and provide a design plan of the designed UAS designed to be utilized to implement the task.

17 Claims, 3 Drawing Sheets

(56) References Cited

U.S. PATENT DOCUMENTS

| | | | |
|---|---|---|---|
| 8,838,420 B2* | 9/2014 | Herbstreit | G06F 17/5095 |
| | | | 703/2 |
| 8,959,007 B2* | 2/2015 | Khella | G05B 17/02 |
| | | | 703/13 |
| 8,967,526 B2 | 3/2015 | Karem | |
| 9,081,914 B2* | 7/2015 | Edwards | G06F 17/50 |
| 9,348,333 B1* | 5/2016 | Buchmueller | G05D 1/0011 |
| 9,550,577 B1 | 1/2017 | Beckman | |
| 9,573,684 B2 | 2/2017 | Kimchi | |
| 9,940,432 B1* | 4/2018 | Hensel | B64C 39/024 |
| 10,032,125 B1* | 7/2018 | Berg | G06Q 10/083 |
| 2006/0249622 A1 | 11/2006 | Steele | |
| 2010/0217437 A1* | 8/2010 | Sarh | B25J 9/0084 |
| | | | 700/248 |
| 2013/0034834 A1 | 2/2013 | Lee | |
| 2014/0032034 A1 | 1/2014 | Raptopoulos | |
| 2014/0142785 A1 | 5/2014 | Fuentes | |
| 2014/0172619 A1* | 6/2014 | Zahasky | G06Q 30/0621 |
| | | | 705/26.5 |
| 2015/0051783 A1 | 2/2015 | Tamir | |
| 2015/0064658 A1 | 3/2015 | Hales | |
| 2015/0120094 A1 | 4/2015 | Kimchi | |
| 2015/0203200 A1 | 7/2015 | Bye | |
| 2015/0277440 A1 | 10/2015 | Kimchi | |
| 2015/0312774 A1 | 10/2015 | Lau | |
| 2016/0075423 A1 | 3/2016 | Karem | |
| 2016/0196755 A1 | 7/2016 | Navot | |
| 2016/0257401 A1 | 9/2016 | Buchmueller | |
| 2017/0110017 A1 | 4/2017 | Kimchi | |

OTHER PUBLICATIONS

3D Robotics; "IRIS + Drone—Assembly"; Published on Sep. 23, 2014; https://www.youtube.com/watch?v=7IO2Zcq9y-A; 6 pages.

Admin, Blog; "Easy Drone—the first modular plug-and-fly aerial solution"; Published May 15, 2014; http://droneblog.com/2014/05/15/easydronethefirstmodularplugandflyaerialsolutionq/; 14 pages.

Easy Drone; "Easy Drone assembly procedure"; Published on May 9, 2014; https://www.youtube.com/watch?v=VOKz3IJ3v0M; 5 pages.

Hobbyview; "Realflight Drone Simulator"; Published Dec. 20, 2015; https://www.youtube.com/watch?v=hnKNJTsyQLM; 11 pages.

Lopez, Juan et al.; "Modular Avionics for Seamless Reconfigurable UAS Mission"; 1.A 3.1-3.10; Published in Digital Avionics Systems Conference, 2008; https://upcommons.upc.edu/bitstream/handle/2117/2519/1a3.pdf; Retrieved from PCT Search Report dated Jun. 5, 2017; 11 pages.

Mas, Fernando et al.; "International Journal of Advanced Manufacturing Technology: A Process Oriented Approach to Modelling the Conceptual Design of Aircraft Assembly Line"; https://www.researchgate.neVprofile/Jose_Rios6/publication/256582852_A_process_oriented_approach_to_modetling_the_conceptual_design_of_aircraft_assembty_line/tinks/55656cc908aec 4b0f4859be5.pdf; Published in Jul. 2013; Retrieved from PCT Search Report dated Jun. 5, 2017; pp. 771-784.

PCT; App. No. PCT/US2017/023359; International Search Report and Written Opinion dated Jun. 5, 2017.

Sensefly; "eBee—Extended User Manual"; http://my.sensefly.com; Published in Apr. 2015; 174 Pages.

* cited by examiner

UNMANNED AIRCRAFT SYSTEMS AND METHODS OF ASSEMBLY

CROSS-REFERENCE TO RELATED APPLICATION

This application claims the benefit of U.S. Provisional Application No. 62/313,314, filed Mar. 25, 2016, which is incorporated herein by reference in its entirety.

TECHNICAL FIELD

This invention relates generally to unmanned aircraft systems (UAS).

BACKGROUND

The use of unmanned aircraft systems (UAS) has been increasing over the last several years. This includes both commercial and recreational uses. Accordingly, there is a large number of UASs that are in use. The different uses of UASs has similarly been increasing. Further, it is expected that the number of uses of UASs will continue to increase.

BRIEF DESCRIPTION OF THE DRAWINGS

Disclosed herein are embodiments of systems, apparatuses and methods pertaining unmanned aircrafts (UAS) and methods of assembling UASs. This description includes drawings, wherein.

Figure 1:
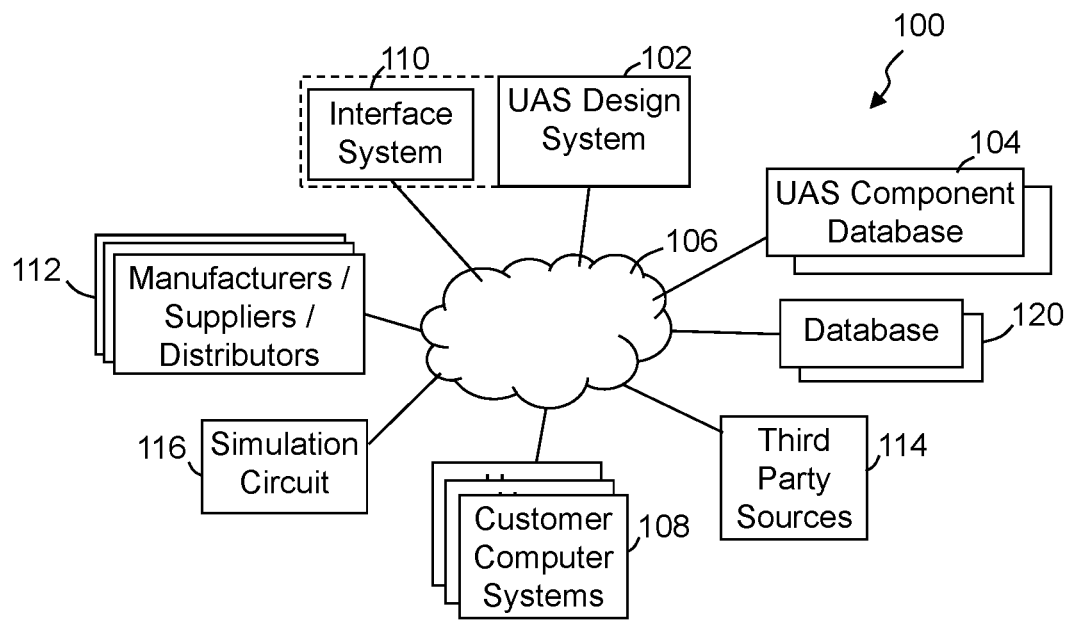
FIG. 1 illustrates a simplified block diagram of an exemplary system, in accordance with some embodiments, that includes one or more UAS design systems.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED. DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein that enable the custom design and assembly of an unmanned aircraft system (UAS) based on one or more intended tasks to be performed by and/or using the designed UAS. Some embodiments include, access and/or maintain a UAS component database storing UAS component identifiers and corresponding UAS attributes for each of numerous UAS components. Some embodiments include a UAS design system that includes a design control circuit that is communicatively coupled with the UAS component database. The design control circuit is configured to obtain a set of multiple task parameters specified by a customer and corresponding to a requested task that the customer is requesting a UAS be designed to perform. The design control circuit can identify, from the UAS component database, at least one primary type of UAS component to be included in a UAS being designed based on a correlation between the task parameters and the UAS component attributes of the UAS components. A first set of one or more secondary types of UAS components are further identified from the UAS component database that are to be included in the designed UAS to support the one or more primary types of UAS components while implementing the first task. A design plan of the designed UAS designed to be utilized to implement the first task can be provided based on the identified UAS components. In some embodiments, the design plan specifies at least a first primary UAS component that corresponds to at least a first primary type of UAS component identified, and secondary UAS components that each correspond to at least one of the secondary types of UAS components. The first primary UAS component and the secondary UAS components are configured to cooperate in assembling the designed UAS intended to implement the requested task.

FIG. 1 illustrates a simplified block diagram of an exemplary system 100, in accordance with some embodiments, that includes one or more UAS design systems 102. The system 100 further includes and/or has access to one or more UAS component databases 104 over a distributed computer and/or communication network 106 (e.g., Internet, WAN, LAN, Wi-Fi, cellular, BLUETOOTH, other such networks, or combination of two or more of such networks). The system includes and/or is remotely accessible by multiple customers through customer computer systems 108 (e.g., computers, laptops, tablets, smartphones, etc.) over the distributed computer network 106. An interface system 110 can be included in the system and/or is implemented as part of the UAS design system. Manufacturers, suppliers and/or distributors 112 may also couple with the system and be in communication with the UAS design system 102 over the computer network 106. Further, in some embodiments, third party source 114 may provide information to the UAS design system, such as attribute information, ratings, and other such information. Some embodiments further include a simulation system and/or circuit 116. One or more other databases 120 may be included and/or accessible by one or more components of the system 100.

The UAS design system 102 is communicatively coupled with the UAS component database 104 to access attributes of multiple different UAS components. The attributes of each UAS component can define and/or correspond to the functionality, capabilities, limits, capacities, characteristics and/or other such attributes. For example, the attributes of a UAS frame structure may include, but is not limited to, weight, dimensions, numbers of motor propeller couplers or supports, weight that can be supported by the frame while in flight, other types and/or numbers of couplers to support components and/or added functional features (e.g., crane, mechanical arm, camera, gimbal system, etc.), other such attributes, and typically a combination of two or more of such attributes. As another example, the attributes of a propeller motor may include, but not limited to, power, torque, weight, dimensions, type of coupler to cooperate with a main frame, lift capacity (which may correspond to a type and/or size of propeller), other such attributes, or combination of two or more of such attributes. In some implementations, the UAS component database and/or the UAS design system further stores and maintains information regarding the ability of components to cooperate physically, electrically and/or communicatively. The UAS component databases may store additional information about the UAS components, UASs that can be assembled, and/or preassembled UASs.

Figure 2:
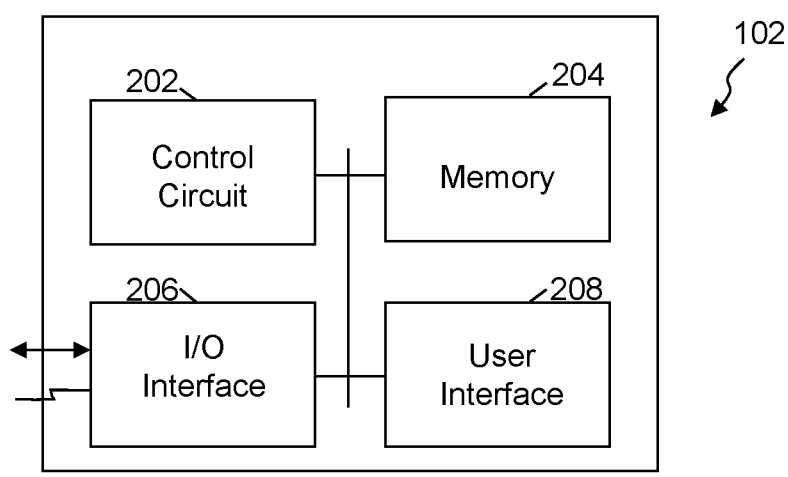
FIG. 2 illustrates a simplified block diagram of an exemplary UAS design system, in accordance with some embodiments.

FIG. 2 illustrates a simplified block diagram of an exemplary UAS design system 102, in accordance with some embodiments. The UAS design system 102 includes one or more design control circuits 202, memory 204, and input/output (I/O) interfaces and/or devices 206. Some embodiments further include one or more user interfaces 208. The control circuit 202 typically comprises one or more processors and/or microprocessors. The memory 204 stores the operational code or set of instructions that is executed by the control circuit 202 and/or processor to implement the functionality of the UAS design system 102. In some embodiments, the memory 204 may also store some or all of particular data that may be used to determine and/or receive task information and/or parameters, task characteristics, evaluate UAS component attributes relative to task parameters, identify UAS components, and/or make other associations, determinations, measurements and/or communications described herein. Such data may be pre-stored in the memory 204, received from an external source, be determined, and/or communicated to the UAS design system.

In some implementations, the control circuit 202 and/or processor may be implemented as one or more processor devices as are well known in the art. Further, in some instances, the control circuit 202 may be implemented through multiple processors distributed over one or more computer networks. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Although the memory 204 is shown as internal to the UAS design system 102, the memory 204 can be internal, external or a combination of internal and external memory. While FIG. 2 illustrates the various components being coupled together via a bus, it is understood that the various components may actually be coupled to the control circuit 202 and/or one or more other components directly.

Further, the control circuit 202 and/or electronic components of the UAS design system 102 can comprise fixed-purpose hard-wired platforms or can comprise a partially or wholly programmable platform. These architectural options are well known and understood in the art and require no further description here. The UAS design system and/or control circuit 202 can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the UAS design system 102 to external components, such as the UAS component databases 104, customer computer systems 108, manufacturers and suppliers 112, simulation circuit 116, third party sources 114, databases 120, and other such devices or systems. Typically, the I/O interface 206 provides wired communication and/or wireless communication (e.g., Wi-Fi, BLUETOOTH, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some implementations, the UAS design system includes one or more user interfaces 208 that may be used for user input and/or output display. For example, the user interface 208 may include any known input devices, such one or more buttons, knobs, selectors, switches, keys, touch input surfaces, audio input, and/or displays, etc. Additionally, the user interface 208 include one or more output display devices, such as lights, visual indicators, display screens, etc. to convey information to a user, such as but not limited to UAS component type information, UAS component identifiers, attributes, customer information, design parameters, task parameters, tasks, UAS designs, status information, communication information (e.g., text messages, emails, etc.), operating status information, notifications, errors, conditions, and/or other such information. Similarly, the user interface 208 in some embodiments may include audio systems that can receive audio commands or requests verbally issued by a worker, and/or output audio content, alerts and the like.

The UAS design system receives information about a task to be performed and identifies UAS components that can be assembled into a complete UAS that is designed to perform at least the task intending to be performed. The design control circuit is configured to obtain a set of multiple task parameters. In some instances, the task parameters are specified by a customer, a designer, UAS manufacturer, or other individual or entity. The task parameters corresponds to a requested task that the requester is requesting a UAS be designed to perform. For example, in some embodiments customers, through their respective customer computer systems 108, access the UAS design system and provide or select a set of multiple task parameters. Additionally or alternatively, a customer may select a predefined type of task or a particular task. Based on the selection, the UAS design system can provide the customer with options regarding that task that the design control circuit can associate with one or more UAS component attributes. For example, a task type that a customer may identify or select may be the task of capturing video. The design control circuit can provide the customer with options that correspond to attributes of UAS components, such as but not limited to options regarding resolution, day or night video capture, lighting, duration of video capture, intended use of the video, other such parameters, or a combination of two or more of such parameters.

Using the task parameters, the design control circuit can identify, from the UAS component database, one or more primary types of UAS components to be included in the UAS being designed based on a correlation between the task parameters and the UAS component attributes of the UAS components. The primary type of UAS component can, in some instances, include a UAS component that is critical to performing the task and/or at a level desired by the customer. For example, a task may be to capture video and a primary parameter may include capturing at a minimum high definition (HD) video content (e.g., 1360×768). Accordingly, a primary type of UAS component may include a video camera that is capable of capturing at least HD video. As another example, the task may be to delivery packages to customers of a retail shopping facility, and a primary type of UAS component may include propeller motors that are highly reliable and provide a lift force sufficient to lift a threshold minimum corresponding to expected package weights and an approximate weight of the UAS.

The design control circuit is further configured to identify, from the UAS component database, a set of one or more secondary types of UAS components to be included in the designed UAS and to support one or more primary types of UAS component while the designed UAS is implementing the intended task. For example, the design control circuit may identify through the UAS component database one or more HD video cameras as primary components. The attributes of the one or more HD video cameras can be identified and/or received from a customer, such as weight, dimensions, type of mounting, whether the HD video camera includes a gimbal assembly, whether the HD video camera can be cooperated with a gimbal assembly, range of motion, and the like. Using the attributes of the one or more primary components (e.g., HD video cameras), the design control circuit 202 can identify types of secondary UAS components that can support the use of the one or more HD video cameras, such as one or more frames with which a gimbal assembly can cooperate and can support the expected weight of the camera and other components of the UAS, motors and propellers that are capable of providing sufficient lift and mobility to the UAS, control systems that can communicatively couple with the HD video camera and/or gimbal control system, lights when relevant, other such secondary UAS components, and typically a combination of such components.

Further, the design control circuit typically cross-references attributes of the secondary UAS components with other primary and secondary components regarding compatibility between components (e.g., physical couplings, electrical couplings, communication couplings, capacities, etc.). In some embodiments, the design control circuit utilizes one or more templates and/or has checklists used in identifying primary and/or secondary types of components. For example, a basic template may specify minimum types of components so that the UAS can fly (e.g., a frame, motors and propellers, a control system that wirelessly communicates with a remote controller, etc.). Other templates may include additional components and/or may be specific to one or more types of tasks. In some embodiments, the types of primary and secondary components identifies different or alternative components that can interchangeably be used in the UAS (e.g., three different propeller motors that can be used, two different frames, two different gimbal mountings, six different cameras, etc.). Customers can select from the options. This can allow the customer more control over the design while providing the customer with the ability to further customize the design. Further, in some instances, the customer may be provided with information about the alternative components and/or the differences between components (e.g., attributes, comparisons, expected effects in using one component versus another, pricing difference, etc.). Typically, alternative components and corresponding information is provided to the customer prior to completing the design plan to allow the customer to select and/or customize the intended UAS prior to finalizing a design plan.

In some embodiments, many if not all of the UAS components are configured with predesigned, standard, universal and/or generic couplings, whether physical, electrical and/or communicative. Component manufacturers in designing components can design the components with the standard couplings. As such, the UAS components likely will easily cooperate together because each component has corresponding couplings. Some UAS components may not utilize or be designed with the standard couplings. The attributes information maintained in the UAS component database and/or accessed through one or more other databases or sources can include coupling attributes for some if not all of the potential UAS components. The coupling information is further utilized by the design control circuit in identifying components that can be cooperated together, and/or adaptors that are also specified in the UAS component database and/or other databased that allows components to be cooperated. Further, the design plan can include information and/or directions about how the couplings couple together.

The design control circuit uses the various attributes and the compatibilities of the different primary and secondary UAS components to configure and provide one or more design plans of one or more UASs designed to be utilized to implement the task the customer wants to have the UAS perform. One or more of these design plans can be provided to the customer, manufacturer, third party service, or the like, for consideration. In some applications, a design plan specifies one or more primary UAS components that correspond to each of the primary types of UAS components, and one or more secondary UAS components that each correspond to at least one of the secondary types of UAS components. Further, the design plans are generated so that one or more identified primary UAS components and one or more identified secondary. UAS components are configured to cooperate in assembling the designed UAS intended to implement the intended task. In some embodiments, a design plan may identify alternative UAS components that can interchangeably be used in the UAS (e.g., three different propeller motors that can be used). This can allow the customer more control over the design while providing the customer with the ability to further customize the design. Further, in some instances, the design may provide information about alternative components (e.g., attributes, comparisons, expected effects in using one component versus another, pricing difference, etc.). In some embodiments, the design plan further includes instructions for assembling the UAS when the customer is expected to assemble the UAS. In other instances, the UAS design system may provide the customer with an option to order a designed UAS (which may include selected optional components and/or interchangeable components). Additionally or alternatively, the design plan can be communicated to a manufacturer, supplier, or distributor 112, or a third party 114, to assemble and ship the assembled UAS to the customer. In other instances, the customer can communicate the design plan to a supplier 112, third party or the like.

In some embodiments, the design control circuit in identifying the first set of the one or more secondary types of UAS components is configured to identify the secondary types of UAS components that ensure the designed UAS is capable of flight while employing the first primary UAS component in performing the first task. Similarly, in some implementations, the primary types of UAS components are identified to ensure that the UAS can fly while performing the intended task. The UAS component database typically maintains information about each of the UAS components so that the design control circuit can identify components that will cooperate together. The design control circuit in providing the design plan can confirm, in accordance with the UAS component attributes, that each of the primary and/or secondary UAS components physically and electrically cooperate with one or more of the primary UAS component(s) and/or the secondary UAS components.

Some embodiments allow customers (e.g., UAS users, designers, manufacturers and/or other entities) to access one or more user interfaces, and/or the system distributes interface information to populates and/or dictates the display of one or more user interfaces at the customer computer system. In some implementations, the system includes the interface system 110 configured to distribute user interface information over the computer network 106 to the plurality of geographically distributed and unassociated customers through corresponding customer computer systems 108. In some applications, the user interface information can populate, with respect to each of the plurality of customers, a request user interface corresponding to at least one of multiple different predefined tasks for which a UAS can be designed. As described above, a listing or the like of types of tasks and/or specific tasks can be provided to a customer allowing the customer to select one or more types of tasks and/or specific tasks. Some embodiments may provide sub-listings in response to a selection of one or more types of tasks or specific tasks. For example, upon receiving a notification of a selection of a type of task, one or more user interfaces may be displayed that identify one or more specific tasks that are associated with a selected type of task.

Figure 3:
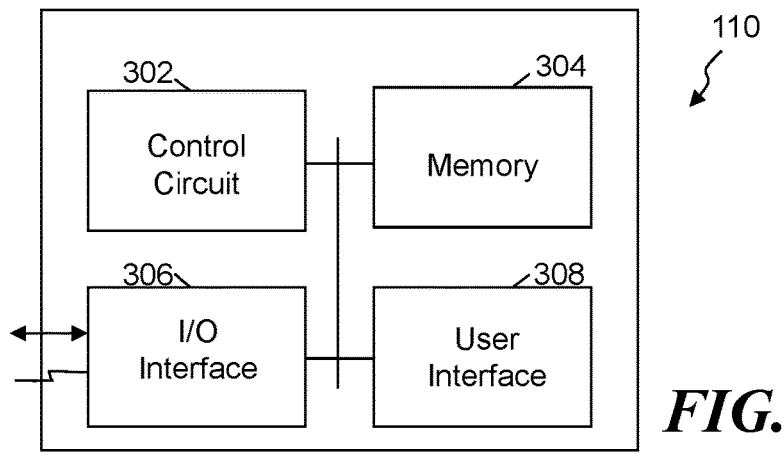
FIG. 3 shows a simplified block diagram of an exemplary interface system, in accordance with some embodiments.

FIG. 3 shows a simplified block diagram of an exemplary interface system 110, in accordance with some embodiments. The interface system 110 includes one or more interface control circuits 302, memory 304, and input/output (I/O) interfaces and/or devices 306. Some embodiments further include one or more user interfaces 308. The control circuit 302 typically comprises one or more processors and/or microprocessors. The memory 304 stores the operational code or set of instructions that is executed by the control circuit 302 and/or processor to implement the functionality of the interface system 110. In some embodiments, the memory 304 may also store some or all of particular data that may be used to assemble interface information, distribute interface information, maintain graphical user interfaces, display graphical user interfaces, receive responses and identify subsequent user interface information and/or alternative user interface information, and/or make other associations, determinations, measurements and/or communications described herein. Such data may be pre-stored in the memory 304, received from an external source, be determined, and/or communicated to the interface system. In some implementations, the interface control circuit 302 and/or processor may be implemented as one or more processor devices as are well known in the art. Further, in some instances, the control circuit 302 may be implemented through multiple processors distributed over one or more computer networks. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Although the memory 304 is shown as internal to the interface system 110, the memory 304 can be internal, external or a combination of internal and external memory. While FIG. 3 illustrates the various components being coupled together via a bus, it is understood that the various components may actually be coupled to the interface control circuit 302 and/or one or more other components directly.

The control circuit 302 and/or electronic components of the interface system 110 can comprise fixed-purpose hard-wired platforms or can comprise a partially or wholly programmable platform. These architectural options are well known and understood in the art and require no further description here. The interface system and/or control circuit 302 can be configured (for example, by using corresponding programming as will be well understood by those skilled in the art) to carry out one or more of the steps, actions, and/or functions described herein. In some implementations, the control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the interface system 110 to external components, such as the UAS design system 102, UAS component databases 104, customer computer systems 108, manufacturers and suppliers 112, simulation circuit 116, third party sources 114, databases 120, and other such devices or systems. Typically, the I/O interface 306 provides wired communication and/or wireless communication (e.g., Wi-Fi, BLUETOOTH, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the interface control circuit 302 communicates the user interface information to customer computer systems associated with each of the plurality of customers and configured to populate at the customer computer systems the request user interface comprising predefined fields to receive task parameters corresponding to one of the multiple predefined tasks. The control circuit receives, from the customer computer systems through the request user interface, sets of task parameters corresponding to one of the multiple predefined tasks for which a UAS is being designed. Additionally or alternatively, in some applications interface system is configured to distribute user interface information over the computer network to a customer computer system associated with a customer to populate a user interface, and to receive through the user interface a selection of one or more primary UAS components from a plurality of potential primary UAS components that correspond to one or more primary types of UAS components. Similarly, the interface system can distribute user interface information to populate a user interface and receive through the user interface a selection of one or more secondary UAS components from a plurality of potential secondary UAS components that correspond to one or more secondary types of UAS components. Additionally or alternatively, the interface system may receive a selection of one or more attributes from a user interface displaying multiple different attributes that correspond to a task, a primary type of UAS component, a secondary type of UAS component, optional features, and/or other such options.

Some embodiments further include a simulation circuit 116 that enables a customer to virtually simulate the operation, flight and/or control of a designed UAS. In some instances, the simulation circuit distributes user interface information over a computer network to one or more customer computer systems associated with a customer to enable the customer to simulate flight of the designed UAS in accordance with predefined flight characteristics corresponding to one or more of the primary UAS components and/or one or more of the secondary UAS components. A controller may be in wired and/or wireless communication with the customer computer system that can detect commands issued through the controller and relay those commands to a simulation application on the computer system and/or communicated back to the simulation circuit that can cause the commands to be implemented to adjust the simulated flight of the simulated UAS. In some applications, the controller is the same controller that may be used to control the actual flight of a UAS and/or the designed UAS if built. The simulation may provide obstacles, varying conditions and the like. Further, the simulation may correspond to the task for which the designed UAS is intended to implement.

In some embodiments, the simulation circuit may provide a simulation that confirms the capabilities of the UAS and/or tests the customer's skill at controlling the designed. UAS. Further, in some applications, the simulation circuit is further configured to distribute the user interface information to a customer computer system causing the customer to control a simulated UAS corresponding to the designed UAS through at least a certification simulation. The certification may be government required before design can be provided to the customer and/or the UAS can be built and/or distributed. In other instances, the certification is used by the customer when attempting to market the services and/or capability of the designed UAS and/or the customer, or other such reasons.

Figure 4:
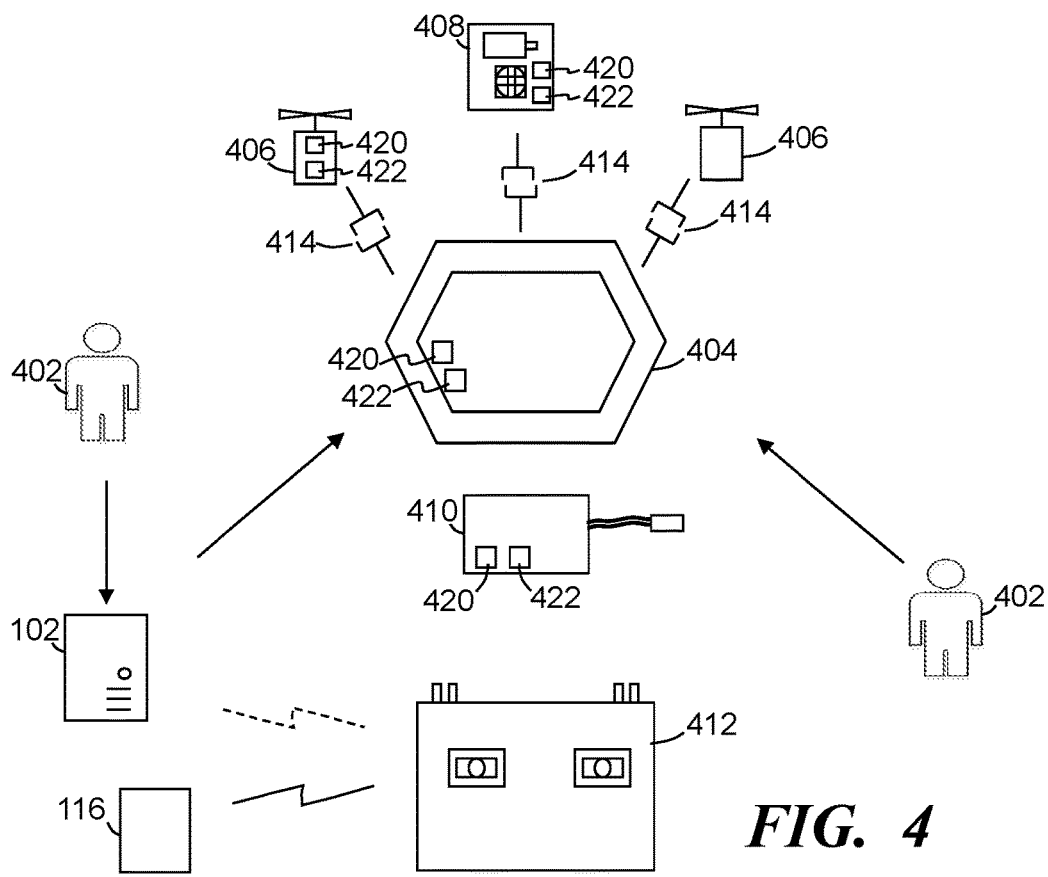
FIG. 4 shows a simplified block diagram of the UAS design system in communication with a customer submitting a request for a UAS design plan, in accordance with some embodiments.

FIG. 4 shows a simplified block diagram of the UAS design system 102 in communication with a customer 402 submitting a request for a UAS design plan, in accordance with some embodiments. In response to the request, the UAS design system determines one or more relevant primary and secondary components based on the intended task and generates the UAS design plan. The customer can receive the components of the designed UAS in accordance with the design plans. In some instances, the customer may order the components through the UAS design system, while in other instances the customer may access one or more other sources. In some embodiments, the user interface may provide the customer with Internet links to one or more other sources. The customer 402 or third party can assemble the designed UAS. As described above, the customer 402 submits the request for a UAS design and the task parameters to the UAS design system 102. Using at least the task parameters, the UAS design system generates a UAS design that specifies the one or more components to be included in the design (e.g., a frame 404, propeller motors 406, a UAS control circuit 408, power and/or battery pack 410, and other such components that are consistent with implementing the desired one or more tasks (e.g., one or more cameras, gimbals, package carrying systems, crane systems, lights, sensors, wireless communication and/or relay systems, etc.). In some applications, the UAS design system uses the component attributes to confirm that the selected components physically, electrically and/or communicatively cooperate together. Further, the UAS design system typically evaluates the attributes in confirming that the components when cooperated will provide a UAS that can fly and perform the intended task, including taking into account flight characteristics of components, physics affecting various components, weights, capabilities, and/or other such factors.

In some embodiments, the customer can further simulate the designed UAS and/or obtain one or more certifications. For example, the customer can establish a communication between the simulation circuit 116 and a UAS remote controller 412, a smartphone, tablet, or other such device, which in some implementations may be part of the UAS design system. The communication connection can be established through a customer computer system 108, a gaming system (e.g., PlayStation, Xbox, etc.), direct through the remote control.

Typically, the UAS design system, in generating the UAS design, confirms that the components are configured to cooperate and operate together. In many instances, the components are designed to readily cooperate with other components, such as through preconfigured couplers 414 mountings, industry standard mountings and/or couplings, and the like. Further, some components may be cooperated with screws, soldering and other such complicated coupling. For example, the couplers 414 may include structural couplings to secure the components together, and in some instances may further include electrical and/or mechanical couplings to allow electrical power, communications (e.g., control, sensor, video, images, audio, etc.), transfer of physical movement, and the like.

In some embodiments, one or more of the components include one or more transport systems 420 and one or more transport controllers 422. The transport systems 420 can cause the component to move to a specified location and to autonomously cooperate with one or more other components of the designed UAS in assembling at least part of the UAS. The transport system may include one or more transport motors, wheels, treads, batteries, gears, drive shafts, other such elements, or combination of such elements. The transport controller communicatively couples with the transport system and includes one or more processors, state machines, controllers, sensors and the like. In some instances, the transport controller implements computer program modules comprising software and/or codes executed by the transport controller to at least control the transport system. For example, a UAS control circuit 408 may include a transport system 420 that can be activated by the control circuitry of the UAS control circuit or a separate transport, controller 422 to cause the UAS control circuit 408 to move to a location to physically couple with one or more other components, such as the frame 404. Similarly, one or more motors 406 may include transport systems 420 and transport controller 422 that controls the transport system 420 to move the motor to a location to autonomously couple with one or more other components of the designed UAS. Some components may further include one or more beacon signal transmitters and/or receivers (e.g., infrared, ultrasound, audible, encoded light, etc.) that can be activated by the transport controller and used to guide a component toward one or more other components in implementing the autonomous coupling (without user intervention).

In some applications, the UAS design system 102 or a separate routing control system identifies locations of each component (e.g., based on a mapping of predefined locations, based on communication from the one or more components, based on communication from other devices (e.g., RFID tag readers, bar code scanners, camera systems and image processing systems, etc.). Using the locations, the UAS design system and/or the separate routing control system can communicate instructions to one or more components with routing information and/or commands (e.g., forward, right (which may be 90 degree turns, or some other defined degree of a turn), left, backward, stop, speed, other such commands, and typically a combination of commands, which may be communicated in groups or sequentially) directing the component to a predefined location and/or to a location to engage another component. Further, in some instances, the transport controller 422 includes one or more sensors and/or one or more sensors are cooperated with a component to enable at least some autonomous routing, such as a beacon sensor to detect a beacon from another component, a beacon at a predefined location or other beacon, a location detection sensor (e.g., bar code reader, RFID tag reader, encoded light detector, etc.). The transport controller may in some instances further include or receive (e.g., from the UAS design system 102) mapping information of one or more areas in which the component may move, and use the mapping information and location sensor information in autonomously controlling the movement of the component. Accordingly, in some applications, one or more of the UAS components can comprise a transport controller 422 and a transport system 420 that is communicatively coupled with the transport controller. The transport controller can execute code to control the transport system to autonomously cause the primary UAS component to move toward at least one of the other UAS components and couple with the other UAS components.

Figure 5:
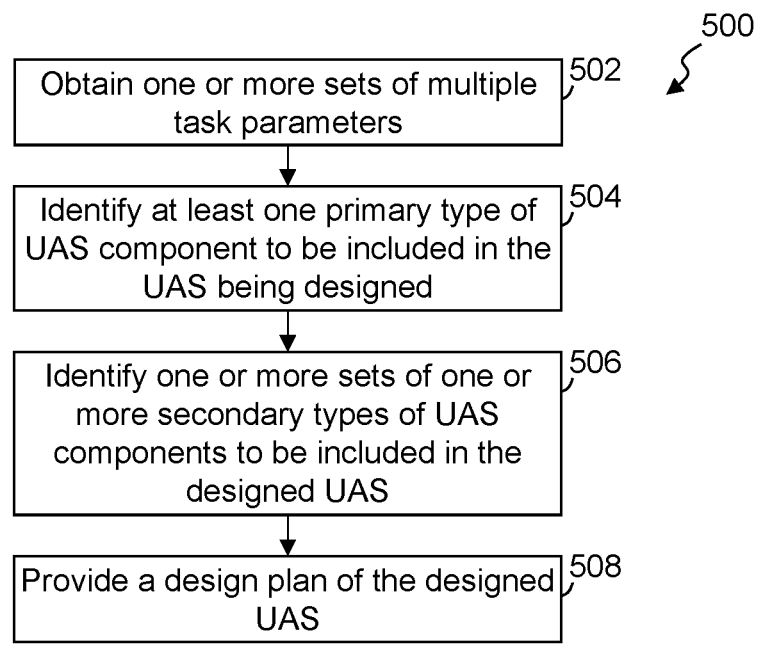
FIG. 5 illustrates a simplified flow diagram of an exemplary process of configuring a UAS from potential components, in accordance with some embodiments.

FIG. 5 illustrates a simplified flow diagram of an exemplary process 500 of configuring a UAS from potential components, in accordance with some embodiments. In some applications, the process designs a UAS based on an intended task. In step 502, a set of multiple task parameters are obtained. The task parameters may be specified by a customer, obtained based on a selection of one or more tasks, selection of specific task parameters, selection of one or more options, and/or otherwise obtained. The task parameters typically correspond to one or more requested task that the customer is requesting a UAS be designed to perform.

In step 504, a UAS component database storing UAS component identifiers and corresponding UAS attributes for each of numerous UAS components is accessed, and from the UAS component database at least one primary type of UAS component is identified that is to be included in the UAS being designed. The identification of the primary type of UAS typically is based on a correlation between the task parameters and the UAS component attributes of the UAS components. In step 506, a set of one or more secondary types of UAS components are identified from the UAS component database that are to be included in the designed UAS. At least some of the secondary types of UAS components are intended to support the one or more primary types of UAS components while the designed UAS is implementing one or more of the intended tasks. In some instances, the UAS design system selects the UAS components in designing the UAS. In other instances, however, the UAS may provide a customer with options of different components that may be used (e.g., twelve different motor types that, based on attributes, should be able to perform the intended task based on potentially other components of the UAS), information about different UAS components may be provided to the customer to allow the customer to make an informed decision in selecting one of the UAS components. The information may include attributes, reviews (e.g., customers, professionals, third party services, etc.), pricing and the like. In some instances, the system may allow the customer to compare one or more of the components so that direct features, attributes and/or ratings are provided (e.g., in a column format). Further, in some instances, the system may sort the different components based on one or more features, attributes, etc., and/or allow a customer to select one or more a features, attributes, etc. that are to be applied in sorting.

In step 508 a design plan of the designed UAS is provided. The designed UAS is designed to be utilized to implement at least one of the one or more tasks for which the UAS is designed. In some implementations, the design plan specifies at least a first primary UAS component that corresponds to the primary type of UAS component, and secondary UAS components that each correspond to at least one of the secondary types of UAS components. The first primary UAS component and the secondary UAS components are configured to cooperate in assembling the designed UAS intended to implement the first task.

In some embodiments, the identification of the set of the one or more secondary types of UAS components and/or the one or more primary types of UAS components includes identifying one or more secondary types of UAS components and/or primary types of UAS components that ensure the designed UAS is capable of flight while employing one or more of the primary UAS components in performing the intended task and/or a separate task. The design control circuit typically further evaluates the attributes of the potential components in providing the design plan and confirms, in accordance with the UAS component attributes, that each of the secondary UAS components physically and electrically cooperate with at least one of a primary UAS component and/or a secondary UAS component. Similarly, the control circuit typically confirms that each of the primary UAS components will cooperate with one or more another primary UAS component and/or one or more secondary UAS components.

Further, some embodiments distribute user interface information over the computer network 106 to a plurality of geographically distributed and unassociated customer computer systems. The user interface information causes a population, with respect to each of the plurality of customers, of a request user interface corresponding to at least one of multiple different predefined tasks for which a UAS can be designed. Typically, the user interface information is communicated to customer computer systems associated with each of the plurality of customers. In some implementations, the user interface information can, in part, populate at each customer computer system the request user interface comprising predefined fields to receive task parameters corresponding to one of the multiple predefined tasks. Sets of task parameters corresponding to at least one of the multiple predefined tasks, and/or one or more attributes of one or more UAS components for which a UAS is being designed can be received from each of the plurality of customer computer systems through the request user interface.

The user interface information can be communicated over a computer network to one or more customer computer systems associated with different customers can cause the user interfaces to populate. One or more selections can be received through the user interface of one or more primary UAS components from a plurality of potential primary UAS components that correspond to at least one of one or more primary types of UAS components. Similarly, one or more selections can be received through the user interface of one or more second UAS components from a plurality of potential second UAS components that correspond to the one or more of the second types of UAS components. In some instances, the displayed user interface may display a listing of primary and/or secondary UAS components that correspond to one or more of the primary and/or secondary types of UAS components. The components may be organized based on a type of component with which the component corresponds.

Some embodiments distribute user interface information over a computer network to a customer computer system associated with a customer and enables the customer to simulate flight of the designed UAS in accordance with predefined flight characteristics corresponding to the one or more primary UAS components and the secondary UAS components. In some applications, the user interface information is distributed to one or more customer computer systems and enabling each customer to control simulated UASs corresponding to the designed. UASs through at least a certification simulation. The simulation allows a customer to virtually test a UAS and/or different UASs that are virtually assembled using different components to help a customer in deciding between corresponding UAS components (e.g., deciding between motors) without having to actually purchase and build the UAS. The simulation circuit in part utilizes the component attributes in simulating the flight.

Some embodiments provide individuals, groups and/or entities with access to one or more interface applications that provide options, features, and functions that assist in designing a UAS. That UAS is designed to be configured to perform at least one or more specified and/or selected tasks. Some embodiments further allow the individual, group, entity, etc. to purchase these components and once received readily cooperate them together to build the custom UAS for at least their intended specific application. In other instances, the one or more UAS design plans can be communicated by the UAS design system 102 and/or the customer, to a manufacturer, supplier, distributed, or other third party to acquire the components and build the UAS on behalf of the customer.

Further, the UAS design system assists customers in designing UASs when those customers may not have the knowledge to evaluate UAS components to determine whether such components would effectively cooperate to provide a functioning UAS. Typically, the designing of UASs includes the evaluation of the physics of operating components and how cooperating them together may affect the physics, functionality and/or the capabilities of these components. Many potential users do not have this knowledge base and the capability to effectively design a UAS that will function as desired. Further, finding relevant components, designing a UAS and building a UAS by oneself generally requires substantial time, and can frequently lead to defective designs and flights due to incorrect selection of components and assembly of parts of the UAS (e.g. wires plugged in the wrong places, poorly secured flight controls, wrong transmitter, etc.).

The present embodiments, however, provide systems and methods to allow customers to readily access user interface information that enables the user to obtain designed UASs that provide plug and play drone systems that provide the correct capabilities to perform at least the desired one or more tasks. In some implementations, many of the standard couplings allows components to be cooperated together few to no screws, bolts, soldering, and other such complex coupling methods, thus simplifying the assembly. For example, many of the standard couplings provide snap fits, latching, compression fits, preconfigured mountings and/or receiving ports, and/or other such standard couplings.

Some embodiments provide a platform that identifies UAS components based on one or more intended tasks to be performed that can readily be cooperated together, and in some instances snap together. For example, a main frame can be identified that includes features, couplings and/or locations to allow other components to attach and/or snap together, such as but not limited to battery mount, gimbal mount (e.g., for camera, lighting, crane, etc.), landing gear, flight control system mount, motor mounts, and/or other components. The UAS design system typically identifies other UAS components that are configured to cooperate with the main frame and comply with flight and/or functional specifications to allow the UAS to perform one or more intended tasks. For example, the UAS design system can identify one or more motors, propellers, batteries, landing gear, camera or other type of gimbal system, flight controls, and/or other such UAS components. Again, the attributes of different components can be considered relative to the one or more tasks attempting to be performed and/or the attributes of other UAS components that have been incorporated and/or potentially could be incorporated into a design. For example, different types of UAS flight controllers have different attributes. As such, the UAS design system 102 can consider attributes of a flight controller such as, but not limited to, GPS system and/or functionality, one or more types of inertial sensors, motor controller, wireless receiver, additional snap in sensors (e.g., light, radar, etc.), and other such attributes.

In some instances, the UAS design system guides customers (e.g., buyers, builders, etc.) into selecting the correct components in order to assemble a UAS that meets or mostly meets the customer's expectations. For example, a customer may want a UAS that is to fly for a specific time, in outside environments, while carrying one or more functional UAS components a camera, a crane system, a package carrying system, etc.). Accordingly, the UAS design system can look at attributes of some components, such as, ability to carrying sufficient batteries to provide specified flight times, controller to compensate for outside flight wind patterns, motor power that can support the weight and type of camera, and other such components, and provide suggested components and/or provide a complete UAS design plan (e.g., suggest a certain air frame, four certain motors, a certain battery and charger, particular flight controller system, and wireless transmitter (which may be part of the flight controller).

The customer may use the UAS design plan and purchase the identified components. In some instances, the UAS design system may provide the customer with the ability to purchase the components through the UAS design system. In other instances, the UAS design system may direct the customer to one or more other sources to purchase the components. For example, in some instances, the design plan may identify one or more sources (e.g., Internet links) to the one or more sources for each of one or more components. The customer can receive the UAS components, and readily assemble the UAS (e.g., assemble the flying platform by snapping the motors to motor mounts of the main flight platform (with built in power lines and control lines the couple with the motors), snapping on the flight control system (with built in power and control lines), installing the battery system (e.g., into a mount with built in power lines that extend through and/or along some or all of the frame to various coupling points (e.g., motor mounts, controller mounts, gimbal mounts, etc.)), wireless pairing of a wireless transceiver with a remote controller, and the like). In still other instances, the customer may forward the UAS design plan to a manufacturer, supplier, third party, etc. to have the designed UAS components obtained and assembled.

In some embodiments, the UAS design system can provide the UAS design plan that, based upon the UAS components selected, includes one or more graphical representations different UAS components and where and how those components cooperate with other components in the most optimal configuration. The UAS system may further prescribe one or more testing approaches so that UAS components are tested in a particular order to confirm that each component was assembled correctly and/or operating in a desired matter. In some instances, the UAS design system can provide one or more a preflight check lists, which may be customized for the components selected and/or for an intended task for which the UAS was designed.

Some embodiments include the simulation circuit 116 and/or system that allows customers to simulate on a customer computer system 108 (e.g., computer, laptop, gaming system (e.g., PlayStation, Xbox, etc.)) how the custom designed and/or built UAS is expected to fly. The simulation circuit, in some instances, may further pull in a mapping interface and/or utilize other such information (e.g., "Google Map", satellite imagery, ground images) of one or more areas where a customer intends to fly the UAS, which can allow the customer to, for example, see limits, like distances, how the terrain would limit/impact flight, and the like.

In some embodiments, the simulation circuit enables a user to obtain one or more levels of certification, and/or in some instances may limit a remote controller programming system from programming a remote controller until the user has obtained a desired level of training and/or skill level. For example, the simulation circuit may allow a user to successfully completing a number of training flights, and communicate a confirmation to an actual remote control flight controller that activates and/or unlocks the controller to enable the UAS to actually be flown. In some implementations, a ground control station (GCS) may log a user's actual flight and grade the user on their safety and flying characteristics. This data could be uploaded to the UAS design system 102, a manufacturer, supplier 112, third party, or the like to be used in evaluating a design, component operation and/or user performance. In some instances, some or all of the flight data can be shared (e.g., social media) and/or a user can be given a ranking to compete with other pilots on safety and flying expertise, and/or used in advertising services. In some embodiments, the simulation circuit 116 may be capable of locking out a remote control flight controller when a user has not tested out correctly. In some applications, the remote control flight controller could be programmable a user could download to it virtual obstacle courses that the user could or must complete (e.g., maintain a level hover, fly a figure "8" displaying control of the craft as it's flying away from and approaching a user, etc.).

In some embodiments, systems, apparatuses and methods are provided to design an unmanned aircraft system based on an intended task, comprising: an unmanned aircraft system (UAS) component database storing UAS component identifiers and corresponding UAS attributes for each of numerous UAS components; and a design control circuit coupled with the UAS component database and configured to: obtain a first set of multiple task parameters specified by a first customer and corresponding to a requested first task that the first customer is requesting a UAS be designed to perform; identify, from the UAS component database, at least one primary type of UAS component to be included in the UAS being designed based on a correlation between the task parameters and the UAS component attributes of the UAS components; identify, from the UAS component database, a first set of one or more secondary types of UAS components to be included in the designed UAS to support the at least one primary type of UAS component while implementing the first task; and provide a design plan of the designed UAS designed to be utilized to implement the first task, wherein the design plan specifies at least a first primary UAS component that corresponds to the primary type of UAS component, and secondary UAS components that each correspond to at least one of the secondary types of UAS components, wherein the first primary UAS component and the secondary UAS components are configured to cooperate in assembling the designed UAS intended to implement the first task.

Some embodiments provide methods of designing an unmanned aircraft system (UAS) based on an intended task, comprising: by a design control circuit: obtaining a first set of multiple task parameters specified by a first customer and corresponding to a requested first task that the first customer is requesting a UAS be designed to perform; identifying, from a UAS component database storing UAS component identifiers and corresponding UAS attributes for each of numerous UAS components, at least one primary type of UAS component to be included in the UAS being designed based on a correlation between the task parameters and the UAS component attributes of the UAS components; identifying, from the UAS component database, a first set of one or more secondary types of UAS components to be included in the designed UAS to support the at least one primary type of UAS component while implementing the first task; and providing a design plan of the designed UAS designed to be utilized to implement the first task, wherein the design plan specifies at least a first primary UAS component that corresponds to the primary type of UAS component, and secondary UAS components that each correspond to at least one of the secondary types of UAS components, wherein the first primary UAS component and the secondary UAS components are configured to cooperate in assembling the designed UAS intended to implement the first task.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of designing an unmanned aircraft system (UAS) based on an intended task, comprising:
    by a design control circuit:
        obtaining a first set of multiple task parameters specified by a first customer and corresponding to a requested first task that the first customer is requesting a UAS be designed to perform;
        identifying, from a UAS component database storing UAS component identifiers and corresponding UAS attributes for each of numerous UAS components, at least one primary type of UAS component to be included in the UAS being designed based on a correlation between the task parameters and the UAS component attributes of the UAS components;

identifying, from the UAS component database, a first set of one or more secondary types of UAS components to be included in the designed UAS to support the at least one primary type of UAS component while implementing the first task; and providing a design plan of the designed UAS designed to be utilized to implement the first task, wherein the design plan specifies at least a first primary UAS component that corresponds to the primary type of UAS component, and secondary UAS components that each correspond to at least one of the secondary types of UAS components, wherein the first primary UAS component and the secondary UAS components are configured to cooperate in assembling the designed UAS intended to implement the first task;

controlling, through a transport controller of the first primary UAS component, a transport system of the first primary UAS component to autonomously cause the first primary UAS component to move toward one of the secondary UAS components and couple with the one of the secondary UAS components; and wherein the providing the design plan comprises accessing the UAS component database, extracting from the UAS component database the UAS component attributes of each of the secondary UAS components and the UAS component attributes of the first primary UAS component, and confirming, in accordance with the UAS component attributes accessed from the UAS component database, that each of the secondary UAS components are physically and electrically configured to cooperate with at least one of the first primary UAS component and another one of the secondary UAS components.

2. The method of claim 1, wherein the identifying the first set of the one or more secondary types of UAS components comprises identifying the secondary types of UAS components that ensure the designed UAS is capable of flight while employing the first primary UAS component in performing the first task.

3. The method of claim 1, further comprising:
distributing user interface information over a computer network to a plurality of geographically distributed and unassociated customers, wherein the user interface information causes a population, with respect to each of the plurality of customers, of a request user interface corresponding to at least one of multiple different predefined tasks for which a UAS can be designed.

4. The method of claim 3, further comprising:
communicating the user interface information to customer computer systems associated with each of the plurality of customers and configured to populate at each customer computer system the request user interface comprising predefined fields to receive task parameters corresponding to one of the multiple predefined tasks; and receiving, from each of the plurality of customer computer systems through the request user interface, sets of task parameters corresponding to one of the multiple predefined tasks for which a UAS is being designed.

5. The method of claim 1, further comprising:
distributing user interface information over a computer network to a first customer computer system associated with the first customer and causing a user interface to populate; and receiving through the user interface a selection of the first primary UAS component from a plurality of potential primary UAS components that correspond to the primary type of UAS components.

6. The method of claim 1, further comprising:
distributing user interface information over a computer network to a first customer computer system associated with the first customer and enabling the first customer to simulate flight of the designed UAS in accordance with predefined flight characteristics corresponding to the first primary UAS component and the secondary UAS components.

7. The method of claim 6, wherein the distributing the user interface information comprises distributing the user interface information to the first customer computer system and enabling the first customer to control a simulated UAS corresponding to the designed UAS through at least a first certification simulation.

8. A system to design an unmanned aircraft system based on an intended task, comprising:
an unmanned aircraft system (UAS) component database storing UAS component identifiers and corresponding UAS attributes for each of numerous UAS components; and a design control circuit coupled with the UAS component database and configured to:
obtain a first set of multiple task parameters specified by a first customer and corresponding to a requested first task that the first customer is requesting a UAS be designed to perform;

identify, from the UAS component database, at least one primary type of UAS component to be included in the UAS being designed based on a correlation between the task parameters and the UAS component attributes of the UAS components;

identify, from the UAS component database, a first set of one or more secondary types of UAS components to be included in the designed UAS to support the at least one primary type of UAS component while implementing the first task; and provide a design plan of the designed UAS designed to be utilized to implement the first task, wherein the design plan specifies at least a first primary UAS component that corresponds to the primary type of UAS component, and secondary UAS components that each correspond to at least one of the secondary types of UAS components, wherein the first primary UAS component and the secondary UAS components are configured to cooperate in assembling the designed UAS intended to implement the first task;

wherein the first primary UAS component comprises a transport controller and a transport system communicatively coupled with the transport controller, wherein the transport controller is configured to execute one or more computer programs to control the transport system to autonomously cause the first primary UAS component to move toward one of the secondary UAS components and couple with the one of the secondary UAS components; and wherein the design control circuit in identifying, from the UAS component database, the first set of one or more secondary types of UAS components is configured to access the UAS component database, extract from the UAS component database the UAS component attributes of each of the secondary UAS components and the UAS component attributes of the first primary UAS component, and confirm, in accordance with the UAS component attributes accessed from the UAS component database, that each of the secondary UAS components are physically and electrically configured to cooperate with at least one of the first primary UAS component and another one of the secondary UAS components.

9. The system of claim 8, wherein the design control circuit in identifying the first set of the one or more secondary types of UAS components is configured to identify the secondary types of UAS components that ensure the designed UAS is capable of flight while employing the first primary UAS component in performing the first task.

10. The system of claim 8, further comprising:
an interface system configured to distribute user interface information over a computer network to a plurality of geographically distributed and unassociated customers, wherein the user interface information is configured to populate, with respect to each of the plurality of customers, a request user interface corresponding to at least one of multiple different predefined tasks for which a UAS can be designed.

11. The system of claim 10, wherein the interface system further comprises an interface control circuit coupled with interface memory storing computer instructions that when executed by the interface control circuit cause the interface control circuit to:
communicate the user interface information to customer computer systems associated with each of the plurality of customers and configured to populate at each customer computer system the request user interface comprising predefined fields to receive task parameters corresponding to one of the multiple predefined tasks; and
receive, from each of the plurality of customer computer systems through the request user interface, sets of task parameters corresponding to one of the multiple predefined tasks for which a UAS is being designed.

12. The system of claim 8, further comprising:
an interface system configured to distribute user interface information over a computer network to a first customer computer system associated with the first customer to populate a user interface, and to receive through the user interface a selection of the first primary UAS component from a plurality of potential primary UAS components that correspond to the primary type of UAS components.

13. The system of claim 12, wherein the design control circuit
wherein the interface system, in distributing the user interface information, is configured to provide, in addition to a listing of a plurality of potential components, a set of selectable attributes, receive a selection of one of the selectable attributes and cause a sorting of the displayed listing of the plurality of potential components based on the selected attribute.

14. The system of claim 8, further comprising:
a simulation circuit configured to distribute user interface information over a computer network to a first customer computer system associated with the first customer to enable the first customer to simulate flight of the designed UAS in accordance with predefined flight characteristics corresponding to the first primary UAS component and the secondary UAS components.

15. The system of claim 14, wherein the simulation circuit is further configured to distribute the user interface information to the first customer computer system and enabling the first customer to control a simulated UAS corresponding to the designed UAS through at least a first certification simulation.

16. The system of claim 8, wherein the design control circuit in obtaining the first set of multiple task parameters specified by the first customer is configured to provide the first customer with options corresponding to the first task specified by the first customer, wherein each of the options corresponds to one or more attributes, of multiple different UAS components, intended to be utilized to implement the first task.

17. The system of claim 8, wherein the design control circuit in providing at least one of the primary component and a first secondary component of the one or more secondary component is configured to identify multiple different alternative components for the at least one of the primary component and the first secondary component, cause information to be communicated to a customer computer system to render through a user interface of the customer computer system an option for each of the multiple different alternative components and information about each of the multiple different alternative components, and receive based on a selection by the customer through the user interface a selected component of the multiple different alternative components, and incorporate the selected component into the design plan.

* * * * *